Oct. 24, 1944. L. J. HIBBARD 2,361,199
CONTROL SYSTEM
Filed Nov. 19, 1942 2 Sheets-Sheet 1

WITNESSES:
C. J. Weller.

INVENTOR
Lloyd J. Hibbard.
BY
ATTORNEY

Oct. 24, 1944.  L. J. HIBBARD  2,361,199
CONTROL SYSTEM
Filed Nov. 19, 1942  2 Sheets-Sheet 2
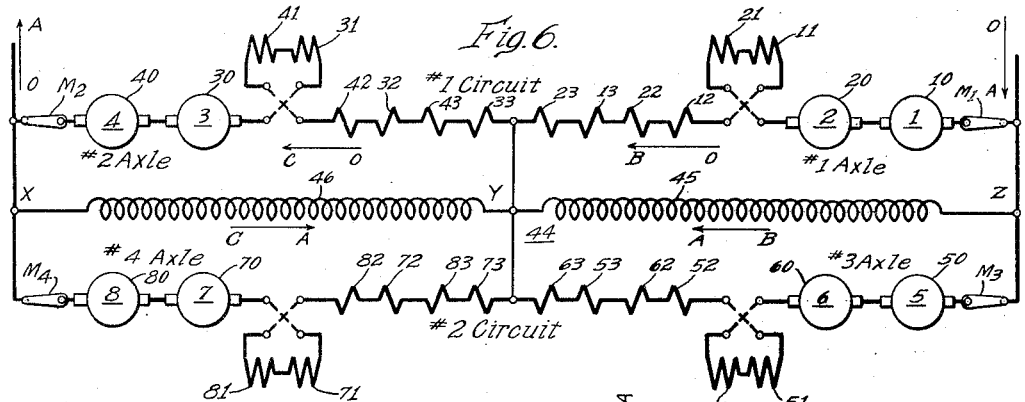
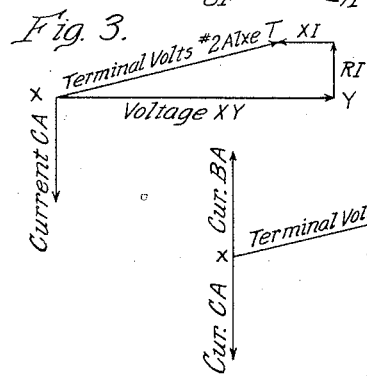
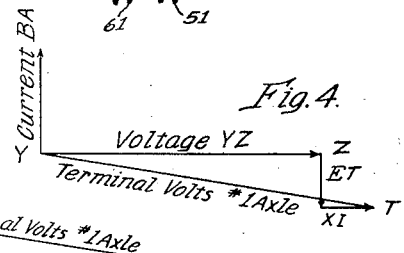
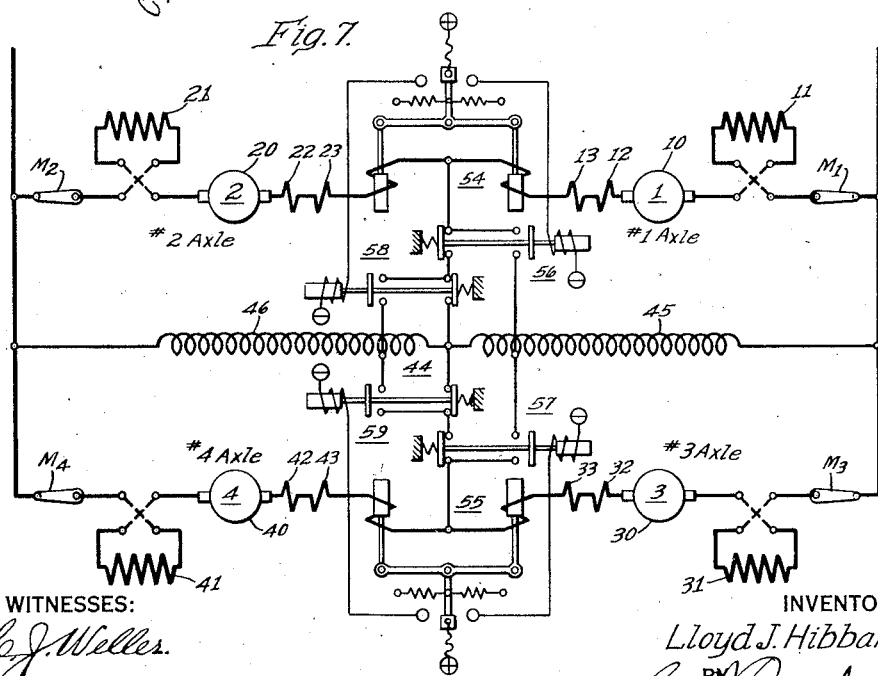
WITNESSES:  INVENTOR
Lloyd J. Hibbard.
BY
ATTORNEY Patented Oct. 24, 1944

2,361,199

UNITED STATES PATENT OFFICE 2,361,199

CONTROL SYSTEM

Lloyd J. Hibbard, Forest Hills, Pa., assignor to Westinghouse Electric & Manufacturing Company, East Pittsburgh, Pa., a corporation of Pennsylvania Application November 19, 1942, Serial No. 466,137

9 Claims. (Cl. 172—179)

My invention relates, generally, to control systems and, more particularly, to systems for controlling the slipping of the driving wheels of electrically propelled locomotives and vehicles.

The maximum amount of tractive effort that any rail motive power unit can develop is dependent upon the percent of adhesion that can be obtained between the wheel rim and the rail. Numerous tests indicate that the percent adhesion varies widely, depending upon the rail condition and, possibly to some extent, upon the speed of the driving wheel. The development of large horsepower outputs at high speeds with modern electric locomotives makes it necessary to provide some means of maintaining high adhesion under the driving wheels for all rail conditions at all speeds.

The modern electric locomotive system of speed control has become increasingly difficult as the horsepower of the units has increased. The inherent economical voltage per motor that can be utilized is so low that the value of motor amperes has increased as the horsepower has been increased. Also, since the amount of horsepower that can be developed in a single motor in the space available over a given axle is limited, the number of motors has increased as the locomotive horsepower has been increased. Hence, in order to keep the value of motor amperes that must be handled by the transformer secondary notching equipment to a reasonable value, the motors on two axles have been connected in series. This practice doubles the voltage and halves the current that must be handled by the transformer tap switches.

If an axle slips, where the motors on two or more axles are connected in series, the slipping axle motor will rob the voltage from the non-slipping motors in its circuit, and will tend to set up conditions where the voltage across the slipping motor will reach two or three times its normal value. The increased voltage on the slipping motor causes its speed to increase still further. Thus, the action becomes cumulative and when an axle slips it must be caught and stopped before it reaches a dangerous speed or the motor will be ruined. Numerous anti-slip relay schemes have been proposed and utilized for stopping the slipping action but these have not been entirely satisfactory and considerable motor trouble is probably caused by overspeeding the motors during wheel slippage. The cumulative action can be avoided by connecting the motors in parallel but, as explained hereinbefore, this increases the duty imposed on the tap switches.

It has also been proposed to so connect a transformer across the armature windings of the motors that the difference in voltages of the motors is utilized to force more current through the motor which is not slipping and increase its torque and at the same time decrease the current through the slipping motor and thereby reduce its torque. This scheme as previously proposed is also not satisfactory since the various armature and field currents become unequal and out of phase with each other when an axle slips. Therefore, the commutation constants of the motors are adversely affected and poor commutation is obtained, particularly when the motors are provided with auxiliary or compensating field windings and interpole or commutating field windings in addition to the main field windings.

Accordingly, an object of my invention, generally stated, is to provide a system for controlling the slipping of the driving wheels of electric locomotives which shall overcome the foregoing disadvantages of previously known systems.

A more specific object of my invention is to provide a control system for series-connected motors which shall secure the equivalent anti-slipping results of parallel operation of the motors.

A further object of my invention is to provide a system for controlling the slipping of series-connected motors which shall not adversely affect the commutating characteristics of the motors.

Another object of my invention is to provide for automatically reducing the voltage across the motor on a slipping axle as the slip speed increases relative to the other axle speeds.

Other objects of my invention will be explained fully hereinafter or will be apparent to those skilled in the art.

In accordance with my invention, a balancing transformer or anti-slip preventive coil is connected across the armature and the field windings of series-connected motors to insure a definite division of the main transformer tap voltage between the motors. Thus, when one motor slips it continues to take essentially the same proportion of the total voltage that it took prior to the slipping. Furthermore, the commutation constants of the motors are not adversely affected since the armature currents and the field currents of each motor are kept equal to and in phase with each other at all times.

For a fuller understanding of the nature and objects of my invention, reference may be had to the following detailed description, taken in conjunction with the accompanying drawings, in which:

Figs. 2, 3, 4 and 5 are vector diagrams showing the value and the phase position of various currents and voltages in the motor circuits;

Fig. 6 is a schematic diagram of a modification of the invention shown in Fig. 1, and Fig. 7 is a schematic diagram of another modification of the invention.

Figure 1:
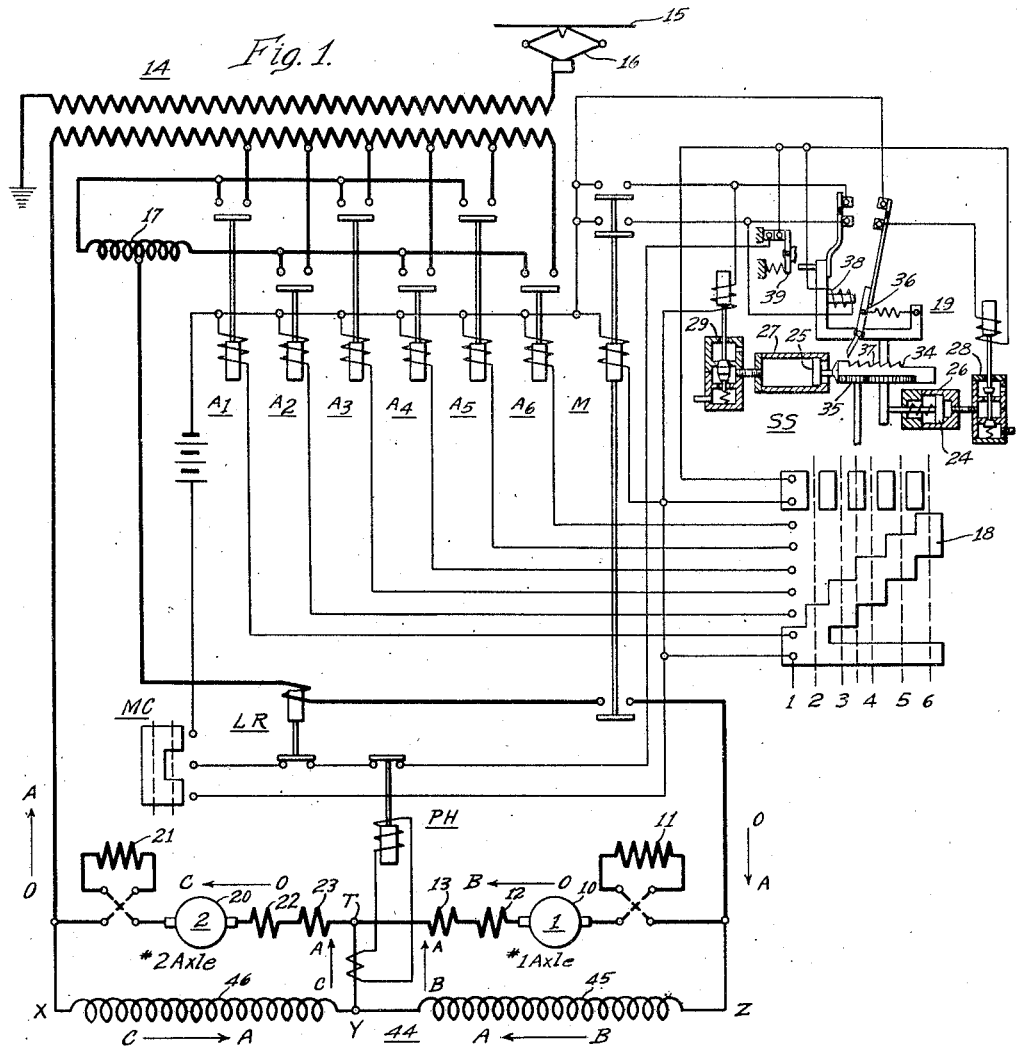
Figure 1 is a diagrammatic view of a control system embodying my invention.

Referring to the drawings, and particularly to Fig. 1, the system shown therein comprises a pair of traction motors 1 and 2 which may be of a type suitable for propelling an electric vehicle (not shown), a main power transformer 14 which may be energized from a power conductor 15 through a current collector 16, a switch M for connecting the motors 1 and 2 to the secondary winding of the transformer 14, a plurality of tap-changing switches A1 to A6, inclusive, for progressively increasing the voltage applied to the motors 1 and 2, and the usual preventive coil 17 for preventing a short circuit between the connections to the transformer 14 during the operation of the tap-changing switches.

The operation of the tap-changing switches is controlled by a sequence switch SS which comprises a drum controller 18 and a notching mechanism 19 for operating the controller 18 in a step-by-step manner. The sequence switch SS is preferably of the type disclosed in Patent No. 1,987,709, issued January 15, 1935, to L. G. Riley and comprises fluid actuated pistons 24 and 25 disposed in cylinders 26 and 27, respectively, magnet valves 28 and 29 for controlling the flow of the pressure fluid to the cylinders 26 and 27, respectively, a rack 34 and pinion 35 for driving the drum 18, a trigger 36 for engaging teeth 37 on the rack 34, a trigger magnet 38 for actuating the trigger 36 and a repeater switch 39 for causing a repetition of the operating stroke of the piston 24.

Since the operation of the notching mechanism is fully described in the aforesaid patent, it is believed unnecessary to describe it in detail in the present application. Briefly, the notching mechanism 19 advances the controller drum 18 step-by-step upon the operation of a master controller MC to energize the magnet valves on the sequence switch. As the controller drum 18 is advanced the tap changing switches A1 to A6 are closed in sequential relation to increase the voltage applied to the motors 1 and 2. The operation of the sequence switch is normally under the control of a limit relay LR which functions to stop the progression of the sequence switch in the event that the motor current exceeds a predetermined value.

In accordance with the usual practice, the motors 1 and 2 are each provided with an auxiliary or compensating winding and an interpole or commutating winding in addition to a main series field winding. Thus, the motor 1 is provided with an armature winding 10, a main field winding 11, a compensating field winding 12 and a commutating field winding 13. Likewise, the motor 2 is provided with an armature winding 20, a main field winding 21, a compensating field winding 22 and a commutating field winding 23. Also, in accordance with the usual practice in the operation of electric locomotives the motors 1 and 2 are connected in series-circuit relation, thereby reducing the current that must be handled by the tap-changing switches.

As explained hereinbefore, considerable trouble has been experienced in the operation of electric locomotives and vehicles with slippage of the wheels driven by the motors. In order to control the wheel slippage, a balancing transformer or anti-slip preventive coil 44 is provided. The transformer 44 comprises two windings 45 and 46 which are disposed in mutually inductive relationship and have a 1:1 ratio. As shown, the winding 45 is connected in parallel-circuit relation to the motor 1 and the winding 46 is connected in parallel-circuit relation to the motor 2, the midpoint between the windings 45 and 46 being connected to the midpoint between the motors 1 and 2.

In order to avoid poor commutation of the motors during wheel slippage the main field winding as well as the additional field windings for each motor are included in the parallel connections for that motor. In this manner the commutation constants of the motors are not affected by the functioning of the balancing transformer 44.

As explained hereinbefore, in the event that one of the axles, for example, the #1 axle which is driven by the motor 1 starts to slip, the voltage of this motor increases, thereby causing a portion of the line current to flow through the transformer winding 45. This causes a similar amount of current to flow through the winding 46 which, in turn, increases the current in the motor 2 relative to that in the motor 1. In this manner the torque on the slipping motor is reduced and the torque on the non-slipping motor is maintained at substantially the same value as before the slip occurred, thereby stopping the slipping action.

If it is desired, a progression holding relay PH may be so connected in the motor circuit that it is energized by the difference in the current between the motors 1 and 2 during wheel slippage. As shown, the contact members of the relay PH are so connected in the control circuit for the sequence switch SS that the operation of this switch and hence the progression of the tap-changing switches is stopped during the slipping condition. In this manner the voltage applied to the motors is not increased during the wheel slippage, thereby further aiding in the stopping of the slipping action. After the wheel slippage has stopped and there is no longer an unbalance in the motor currents the progression of the tap-changing switches is permitted to proceed in the normal manner.

Figure 2:
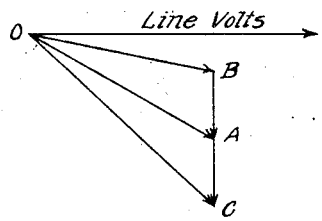

The unbalance in the motor currents is illustrated by the vector diagram in Fig. 2 in which the line current is represented by the vector OA, the current in the motor 1 by the vector OB, in the motor 2 by the vector OC and in the transformer winding 45 by the vector BA and in the winding 46 by the vector CA. As explained hereinbefore, the currents BA and CA are equal and opposite to each other. The line current OA is equal to the vector sum of the currents OB and BA or to the vector difference between the currents OC and CA.

Assuming that the #1 axle is slipping, the difference in the terminal volts across the motors on the #1 axle and the #2 axle is illustrated by the vectors shown in Figs. 3, 4 and 5. Thus, the voltage across the motor on the #2 axle is equal to the vector difference between the voltage XY across the winding 46 and the RI and XI drops resulting from the current flowing through this winding. Likewise, the voltage across the motor on the #1 axle is equal to the vector sum of the voltage YZ across the winding 45 and the RI and XI drops resulting from the current in this winding. The difference in the terminal volts across the motors on the #1 and #2 axles is illustrated by the vector diagram in Fig. 5 which is a combination of the diagrams shown in Figs. 3 and 4.

From the foregoing diagrams it will be seen that the voltage across the #1 axle is increased and the voltage across the #2 axle is decreased as a result of the slipping of the #1 axle. It will be understood that similar conditions prevail for a slipping of the #2 axle, in which case the voltage across the motor 2 will be slightly increased and the voltage across motor 1 will be decreased by the action of the balancing transformer 44.

As explained hereinbefore, the commutating characteristics of the motors are not adversely affected during the wheel slippage since the current through the main field winding and the compensating field and commutating field winding of each motor is equal to and in phase with the armature current for that motor. This condition does not exist in previously known systems of the present type for controlling wheel slippage.

The system shown in Fig. 6 is similar to that shown in Fig. 1 with the exception that additional motors are provided. Furthermore, two motors which may be of the twin type having their armature and field windings permanently connected in series-circuit relation are provided for each axle. As illustrated, the motors for the #1 and #2 axles are connected in series-circuit relation and the motors for the #3 and #4 axles are connected in series-circuit relation. The two groups of motors are connected across the power conductors in parallel-circuit relation, thereby providing the well known series-parallel arrangement.

The motor 1 is provided with an armature winding 10, a main field winding 11, a compensating field winding 12 and a commutating field winding 13. The motor 2 is provided with an armature winding 20, a main field winding 21, a compensating field winding 22 and a commutating field winding 23. The motor 3 is provided with an armature winding 30, a main field winding 31, a compensating field winding 32 and a commutating field winding 33. Likewise, the motor 4 is provided with an armature winding 40, a main field winding 41, a compensating field winding 42 and a commutating field winding 43. The motor 5 is provided with an armature winding 50, a main field winding 51, a compensating field winding 52 and a commutating field winding 53. The motor 6 is provided with an armature winding 60, a main field winding 61, a compensating field winding 62 and a commutating field winding 63. The motor 7 is provided with an armature winding 70, a main field winding 71, a compensating field winding 72 and a commutating field winding 73. Likewise, the motor 8 is provided with an armature winding 80, a main field winding 81, a compensating field winding 82 and a commutating field winding 83.

As illustrated, the balancing transformer 44 is utilized for both groups of motors. Thus, the winding 45 is connected in parallel-circuit relation to the motors on the #1 and the #3 axles while the winding 46 is connected in parallel-circuit relation to the motors on the #2 and #4 axles. Disconnecting switches M1, M2, M3 and M4 are provided for opening the circuits for the two groups of motors. If the locomotive or vehicle is operating with the switches M3 and M4 open, the functioning of the wheel-slippage control will be the same as described for the system shown in Fig. 1.

However, when both circuits are in operation and the #1 axle starts to slip, the voltage across the motors on this axle will increase, which will, in turn, add load current to the #3 axle circuit. This component of current flowing into the #3 axle circuit and through the winding 45 from Y to Z will draw a corresponding component of current through the winding 46 from Y to X which will, in turn, tend to lower both currents BA and CA. This, in turn, will reduce the resultant ZI or impedance drops through the transformer windings and thus limit the terminal voltage of the respective motors. In other words, the slipping of the #1 axle will tend to transfer load to the #3 axle. Therefore, this connection tends to eliminate slipping by cutting down the tractive effort of the slipping circuit in a manner similar to the parallel connection of the axles and tries to hold a constant tractive effort on the locomotive by increasing the loading on the other axle. It will be understood that a progression holding relay may be utilized with the present circuit arrangement to prevent an increase in the voltage applied to the motors during wheel slippage, as hereinbefore described.

In the modification of the invention illustrated in Fig. 7 provision is made for automatically reducing the voltage across the motor on the slipping axle. As shown, the motors 1 and 2 are connected in series-circuit relation and the motors 3 and 4 are likewise connected in series-circuit relation. The two groups of motors are connected in parallel-circuit relation across the power conductors. The winding 45 of the balancing transformer 44 is connected in parallel-circuit relation to the motors 1 and 3. Likewise, the winding 46 is connected in parallel-circuit relation to the motors 2 and 4. Accordingly, a slipping of any one of the motors will cause an unbalance in the currents in the other motors.

In order to actually reduce the voltage across the slipping motor, thereby tending to stop the slipping action, relays 54 and 55 are provided for controlling the operation of switches 56, 57, 58 and 59. The contact members of the switches 56 and 57 are connected to a tap on the transformer winding 45 and the contact members of the switches 58 and 59 are connected to a tap on the transformer winding 46. The relays 54 and 55 may be of the balanced-beam type, each relay having a pair of actuating coils which are so connected in the motor circuits that one of the relays is operated by an unbalance in the motor currents.

As explained hereinbefore, if the motor 1 slips, the current in this motor is decreased and the current in motor 2 is increased as a result of the action of the transformer 44. This unbalance in the motor currents will operate the relay 54 which, in turn, operates the switch 56 to change the parallel connections for the motor 1 to the tap on the transformer winding 45, thereby actually reducing the voltage across the motor 1. The reduction in voltage will tend to decrease the motor speed and therefore stop the slipping action. Likewise, a slipping of the motor 2 will actuate the relay 54 in the opposite direction to operate the switch 58 to connect the motor 2 to the tap on the transformer winding 46, thereby reducing the voltage across the motor 2.

In a similar manner a slipping of the motor 3 will actuate the relay 55 to operate the switch 57 to connect this motor to the tap on the winding 45. Likewise, a slipping of the motor 4 will actuate the relay 55 to operate the switch 59 to connect the motor 4 to the tap on the winding 46. Therefore, any unbalance in the voltages and currents of the respective motors is automatically restored by the operation of the proper relays and the slipping action will be quickly stopped.

From the foregoing description it is apparent that I have provided simple and effective means for controlling slippage of the wheels of electrically propelled rail vehicles, particularly vehicles of the type in which two or more motors are connected in series-circuit relation. The present system provides for effectively controlling wheel slippage without adversely affecting the commutating characteristics of the motors and is, therefore, an improvement over previously known systems of a similar type.

Since many modifications may be made in the apparatus and arrangement of parts without departing from the spirit of my invention, I do not wish to be limited other than by the scope of the appended claims.

I claim as my invention:

1. In a control system, in combination, a plurality of electric motors connected in series-parallel circuit relation, each of said motors having an armature winding, a main field winding and additional field windings, a balancing transformer having a plurality of windings connected in series-circuit relation, means for connecting each of said windings in parallel-circuit relation to a plurality of said motors, the parallel connections for each motor including the armature winding and all of the field windings of said motor, and means responsive to an unbalance of current between two of said motors for selectively varying the voltage across one of said motors.

2. In a control system, in combination, a plurality of electric motors connected in series-parallel circuit relation, each of said motors having an armature winding, a main field winding and additional field windings, a balancing transformer having a plurality of windings connected in series-circuit relation, means for connecting each of said windings in parallel-circuit relation to a plurality of said motors, the parallel connections for each motor including the armature winding and all of the field windings of said motor, and means responsive to an unbalance of current between two of the series-connected motors for selectively reducing the voltage across one of said series-connected motors.

3. In a control system, in combination, a plurality of electric motors connected in series-circuit relation, a balancing transformer having a plurality of windings connected in series-circuit relation, means for connecting each of said motors in parallel-circuit relation to one of said windings, and relay means responsive to an unbalance of current between said motors for selectively varying the relative voltages across the motors.

4. In a control system, in combination, a plurality of electric motors connected in series-circuit relation, a balancing transformer having a plurality of windings connected in series-circuit relation, means for connecting each of said motors in parallel-circuit relation to one of said windings, and means responsive to an unbalance of current between said motors for selectively changing the parallel connections for said motors to said transformer windings to vary the relative voltages across the motors.

5. In a control system, in combination, a plurality of electric motors connected in series-circuit relation, a balancing transformer having a plurality of windings connected in series-circuit relation, means for connecting each of said motors in parallel-circuit relation to one of said windings, and means responsive to an unbalance of current between said motors for selectively changing the connections between the transformer windings and the motors to vary the relative voltages across the motors.

6. In a control system, in combination, a plurality of electric motors connected in series-circuit relation, each of said motors having an armature winding, a main field winding and additional field windings, a balancing transformer having a plurality of windings connected in series-circuit relation, means for connecting each of said motors in parallel-circuit relation to one of said windings, the parallel connections for each motor including the armature winding and all of the field windings of said motor, and relay means responsive to an unbalance of current between said motors for varying the relative voltages across the motors.

7. In a control system, in combination, a main transformer, a plurality of electric motors energized from said transformer, said motors being connected in series-circuit relation, control means for progressively increasing the voltage applied to the motors from said transformer, a balancing transformer having a plurality of windings connected in series-circuit relation, means for connecting each of said motors in parallel-circuit relation to one of said windings, and relay means responsive to an unbalance of current between said motors for holding the main transformer voltage applied to the motors while the unbalanced condition exists.

8. In a control system, in combination, a main transformer, a plurality of electric motors energized from said transformer, said motors being connected in series-circuit relation, a plurality of switches for changing taps on said transformer to progressively increase the voltage applied to the motors from said transformer, control means for controlling the operation of said switches, a balancing transformer having a plurality of windings connected in series-circuit relation, means for connecting each of said motors in parallel-circuit relation to one of said windings, and relay means responsive to an unbalance of current between said motors for controlling the operation of said control means to prevent the progressive operation of said switches thereby holding the main transformer voltage applied to the motors while the unbalanced condition exists.

9. In a control system, in combination, a main transformer, a plurality of electric motors energized from said transformer, said motors being connected in series-circuit relation and each motor having an armature winding, a main field winding and additional field windings, control means for progressively increasing the voltage applied to the motors from said transformer, a balancing transformer having a plurality of windings connected in series-circuit relation, means for connecting each of said motors in parallel-circuit relation to one of said windings, the parallel connections for each motor including the armature winding and all of the field windings of said motor, and relay means responsive to an unbalance of current between said motors for holding the main transformer voltage applied to the motors while the unbalanced condition exists.

LLOYD J. HIBBARD.